UNITED STATES PATENT OFFICE.

ROBERT McLEOD, OF AUCKLAND, NEW ZEALAND.

LUBRICATING COMPOUND.

1,387,437.  Specification of Letters Patent.  Patented Aug. 9, 1921.

No Drawing.  Application filed March 8, 1919. Serial No. 281,473.

*To all whom it may concern:*

Be it known that I, ROBERT McLEOD, a citizen of the Dominion of New Zealand, residing in the city of Auckland, Provincial District of Auckland, Dominion of New Zealand, has invented a new and useful Lubricating Compound; and I do hereby declare the following to be a full, clear, and exact description of the same.

The object of this invention is to produce a cheap and durable compound useful for lubricating purposes, especially to preventing "seizing," or binding, of plug cocks, valve stems, and the like.

It is well known that certain mechanical parts, such as plug stop-cocks, are liable to "seize"—that is, to say, so tightly bind as to require most careful handling to prevent breakage when attempting to loosen the same—especially when submitted to a high temperature, say of superheated steam. In an attempt to meet the difficulty, it has been the usual practice to coat the plug with fat or other grease, before putting the plug in its casing, but as a high temperature rapidly destroys the lubricating qualities of the fat, the plug then sticks fast, and "seizes" if turned around in its casing. Leakage, at the cock, then follows.

My invention provides a composition which entirely avoids the mentioned difficulties, and allows a plug cock or other part to be used for superheated steam, without leakage taking place. When my composition is used, the plug does not require fresh grinding, and will last for a considerable length of time without renewal.

In one form, the composition consists of an intimate mixture, uniform throughout, of rubber and tallow, in the proportions, by weight, of rubber eight parts, and tallow, one part.

In making the composition, the rubber is cut into small pieces, and is boiled until it becomes liquid; the tallow is then added, and the whole is thoroughly stirred until the mixture is uniform throughout. When cool, the mixture, which is generally of jelly-like consistency, or viscous, is used by smearing upon the surface of the plug of the cock, or upon any surface which is to be lubricated or protected against "seizing."

In practice, it has been found that tallow has, seemingly, a solvent action upon the rubber, when in an intimate mixture therewith, and that this property persists for a very long time, and the composition remains soft, lubricating, and steam, air and water-tight and non-leaking even under severe service conditions.

Instead of tallow, or in addition thereto, I may use any suitable grease or oil which will intimately and uniformly mix with rubber and keep the product in a viscous or other state permitting it to be readily applied to a surface or joint to be lubricated or made leak-proof.

What I claim is:—

A compound for lubricating and other purposes, consisting of an intimate mixture, uniform throughout, of about eight parts of rubber and one part of tallow.

In testimony whereof I have signed my name to this specification in the presence of two subscribing witnesses.

ROBERT McLEOD.

Witnesses:
EDWARD BROMWICH,
RICHARD WILLIAM JONES.